Figure 1:
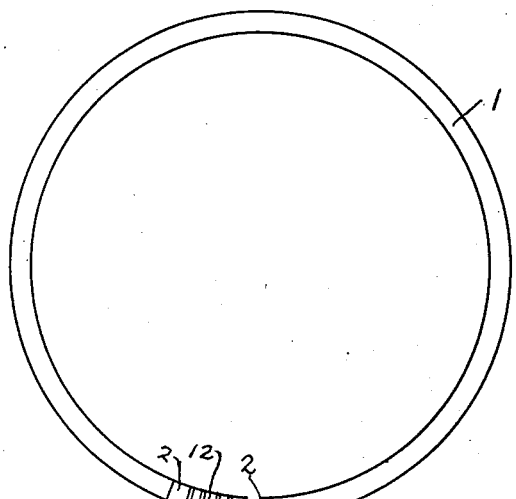

Dec. 20, 1938.  M. M. MEISEL  2,140,710
PISTON RING
Filed March 1, 1938

Inventor
MICHAEL M. MEISEL.
By Howard J. Whelan
Attorney

Patented Dec. 20, 1938

2,140,710

UNITED STATES PATENT OFFICE 2,140,710

PISTON RING

Michael M. Meisel, Baltimore, Md.

Application March 1, 1938, Serial No. 193,249

5 Claims. (Cl. 309—44)

This invention refers to reciprocating engines and more particularly to piston rings for the same. It has among its objects to provide a system for attaching a series of piston rings together that they may be inserted in the piston grooves with greater accuracy, facility and safety. Other objects are to provide a means for doing so that will be economical; that will not affect the operation of the piston used except to improve such; and to have the rings arranged for more practical handling during the fitting operation. Further objects will become apparent as the invention is more fully set forth.

The usual procedure followed in providing rings for pistons and the like is to have such separately arranged and inserted in the grooves of a piston, one at a time. The rings are usually made of cast iron or some other material that is hard and brittle. The fact that the rings are spread apart slightly to enable them to slide over the piston walls, and being of such a brittle nature, causes a considerable proportion to break and lose their utility for the purpose intended. Where several rings are inserted in a single groove, and there is a special arrangement preferable for their positions therein, such arrangement may be upset by the wrong insertion at the time of assembling them in the piston groove, causing them to function improperly and prevent readjustment afterwards. In this invention, the rings, which are quite delicate, are assembled and secured together with a vanishing solder or other adherent, and are arranged for insertion as a single complete unit. This combination of rings, strengthens the same sufficiently to prevent breaking during fitting and inserting on piston, because each tends to reinforce the other. The rings are inserted more quickly and can be more readily adjusted in the grooves to suit the position desired of them.

The rings are suitably treated to permit the adherent to be properly attached and thereby hold them tightly together. The same arrangement is applicable to the rings using springs or other methods to force them out against the walls of piston cylinder. When the pistons, with their rings, have been in operation a short while, the adherent loosens up and allows the rings to separate and function separately in the manner intended, in their use. This arrangement not only serves as a practical one in the installation of the rings, but also enables the rings to expose a lesser number of surfaces while kept in stock, thus lessening the oxidation or rusting possibilities. The keeping of same in a single unit, instead of a series of separate loose rings, as is usually done, makes them stronger and much less liable to breakage in the package, and makes unnecessary the carefulness that would be required otherwise.

Figure 2:
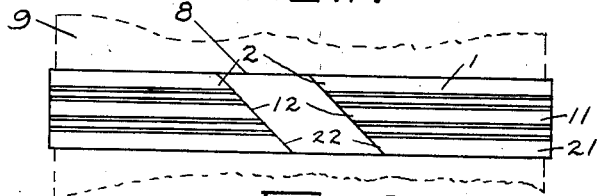
Figure 3:
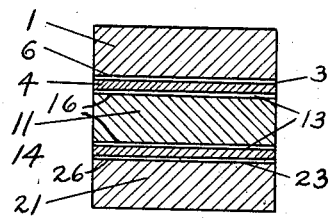
Figure 5:
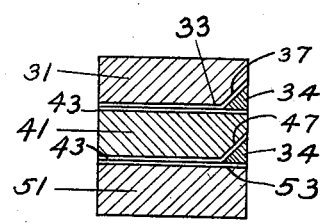
Figure 4:
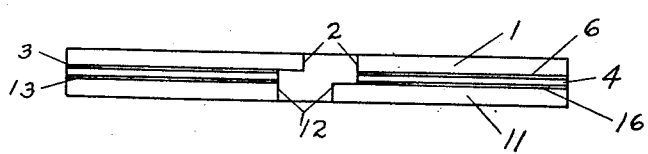
Figure 6:
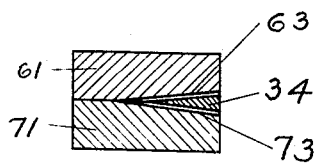

In the construction shown in the drawing, which illustrates an embodiment of this invention:

Figure 1 is a plan view showing a series of piston rings embodying this invention, Figure 2 is a side elevation of the ring shown in Figure 1, positioned in a piston, Figures 3, 4, 5 and 6 show various elevations in section of piston rings having different constructions or forms, which are using the invention.

Similar reference characters refer to similar parts throughout the drawing.

In the construction shown in the drawing, a piston ring 1 of conventional form, having its end portions 2 cut angularly, is preferably plated on one transverse surface 6, with a copper film 3, which affords a protecting surface as well as a means for attaching vanishing soldering 4, used thereto. Another piston ring 11 is similarly treated with a film of copper 13, on its transverse surfaces 16 which are brought adjacent to the transverse face 6 of the previous piston ring 1, and the vanishing soldering adherent 4 used to connect both together. Likewise another ring 21 with its surface 26 similarly treated with a film of copper 23, is connected to last mentioned piston ring with the soldering adherent 14. The end portions 12 of the piston ring 11 and the end portions 22 of the piston ring 21, are preferably cut as indicated in the drawing shown in Figures 1 and 2.

The soldering adherent is termed "vanishing" because it disappears after use and preferably consists of a metallic combination of tin and lead with a low melting point so that the adherent will melt at about 200° F. A glue, cellulose or cement may be used provided it will vaporize or pass off at a temperature less than that within the cylinder used for the piston ring. As the adherent melts, disappears or passes off in the cylinder due to the high temperature or nature of the fluids used with same, the piston rings detach from each other and work independently. When they are separated, they function according to the purpose for which they are intended.

The soldering adherent preferably used is very fluid and takes up very little space, probably not more than .0003 of an inch, allowing the piston rings to be brought very closely together, making same practically homogeneous. A simple way of using the soldering adherent referred to, and known as Wood's formula, consists in inserting the copper or tinned surface of the rings in the melted combination, and after cooling, placing the rings on each other. A heated implement is then placed on the piston ring and its weight and heat allowed to melt the soldering adherent and press the rings closely together. The film of adherent becomes very thin, but is sufficient to fasten the rings substantially together. It is not even necessary that the film of soldering adherent covers the whole surface 6, 16, 26 of the rings to make it hold the piston rings 1, 11, 21 tightly together. Where piston rings are used, as at 31, 41 and 51, with their surfaces partly bevelled as at 37 and 47, the soldering adherent may be used by insertion between them as shown at 34 in Figure 6, or used as at 61 and 71. Copper films 33, 43, 53, 63 and 73 are provided on the respective rings as indicated to facilitate soldering.

After the piston rings are inserted in the grooves 8 of a piston 9, and used for a short while, the friction or heat from the cylinder, melts the soldering adherent and allows it to pass off the piston rings unnoticeably. When this happens the rings become separate from each other and function according to the features provided in their construction. The soldering adherent in each case is used at the place of assembly to position the rings in the exact arrangement suitable for the groove in which they are to be placed and thereby tend to prevent mistakes or positions which would not suit the work to be done. In no case does the use of the adherent selected or other means used for tying the piston rings together interfere with the particular function of the rings, and particularly after the adherent has become dissipated therefrom. The tying together is not of a permanent nature and therefore does not affect the usual functions of the piston rings.

While other forms of the invention might be described or shown, it is not desired to limit this application for patent to the particular details outlined, except as limited by the prior art, as it is appreciated that other details in the construction might be used that would employ the same principles and come within the scope of the appended claims.

Having thus described the invention, what is claimed is:—

1. A piston ring set of the class described comprising in combination, a plurality of piston rings for insertion in a single ring groove of a piston, and means for temporarily attaching same together as one unit, which means being arranged to dissipate after a predetermined period of normal piston operation and permit the rings to be free of each other.

2. A piston ring set comprising in combination, a plurality of piston rings for insertion and use in a single wall ring groove of a piston, and adherent means on the adjacent surfaces of the rings for connecting same together in a single set, said adherent means being arranged to dissipate from the rings after a predetermined period of normal piston use and leave the rings loose from each other.

3. A set of piston rings for a single groove in a piston wall comprising in combination a plurality of piston rings, surface means for temporarily causing the said rings to adhere together in a unit set, said means after placement in the groove and a predetermined period of operation of the piston being adapted to vaporize and dissipate from the surfaces of the rings thereby leaving the latter non-adhering to each other.

4. A set of piston rings for a single groove in a piston comprising a plurality of piston rings, surfacing means on the rings, and means for the said surfacing means for attaching the rings to each other into a single set, said means being adapted to disengage itself from the surfacing means on the rings and leave the latter non-adhering to each other after a predetermined period of normal operation of the piston.

5. A set of piston rings comprising in combination, a plurality of rings arranged in position over each other, a vanishing soldering adherent disposed on the adjoining surfaces of the rings and adapted to hold the rings together as a rigid unit or set, said adherent being arranged to pass away from the adjoining surfaces of the rings after a predetermined period of normal use of the piston in a single groove for rings therein and allow the rings of the unit or set to get free of each other.

MICHAEL M. MEISEL.